US007008529B2

(12) United States Patent
Nakanishi et al.

(10) Patent No.: US 7,008,529 B2
(45) Date of Patent: Mar. 7, 2006

(54) WATER TREATING DEVICE

(75) Inventors: Minoru Nakanishi, Otsu (JP); Minoru Kishi, Kusatsu (JP); Yoshihiro Inamoto, Otsu (JP); Tatsuya Hirota, Kyoto (JP); Tamotsu Kawamura, Yokaichi (JP); Yozo Kawamura, Shiga (JP); Fumitake Kondo, Otsu (JP)

(73) Assignee: Sanyo Electric Co., Ltd., Osaka (JP)

( * ) Notice: Subject to any disclaimer, the term of this patent is extended or adjusted under 35 U.S.C. 154(b) by 52 days.

(21) Appl. No.: 10/475,809

(22) PCT Filed: Apr. 2, 2002

(86) PCT No.: PCT/JP02/03291

§ 371 (c)(1),
(2), (4) Date: Oct. 24, 2003

(87) PCT Pub. No.: WO02/090266

PCT Pub. Date: Nov. 14, 2002

(65) Prior Publication Data

US 2004/0149663 A1 Aug. 5, 2004

(30) Foreign Application Priority Data

Apr. 27, 2001 (JP) ............................. 2001-131537
Apr. 27, 2001 (JP) ............................. 2001-131770

(51) Int. Cl.
*C02F 1/46* (2006.01)
*C02F 1/50* (2006.01)
*C02F 1/76* (2006.01)

(52) U.S. Cl. ..................... 210/98; 210/192; 210/195.1; 204/278.5; 204/662

(58) Field of Classification Search ................ 210/744, 210/746, 748, 754, 97, 98, 192, 169, 195.1, 210/198.1, 243; 204/275.1, 276, 278.5, 661, 204/662, 673; 73/304 R
See application file for complete search history.

(56) References Cited

U.S. PATENT DOCUMENTS

| 3,458,414 | A | * | 7/1969 | Crane et al. ................. 210/746 |
| 4,033,871 | A | * | 7/1977 | Wall ........................... 210/96.1 |
| 4,265,262 | A | * | 5/1981 | Hotine ........................... 137/2 |
| 4,381,240 | A | * | 4/1983 | Russell ....................... 210/746 |
| 4,657,670 | A | * | 4/1987 | Newton ....................... 210/85 |
| 5,422,014 | A | * | 6/1995 | Allen et al. ................. 210/743 |
| 5,759,412 | A | * | 6/1998 | McDougald ................ 210/744 |
| 5,792,343 | A | * | 8/1998 | Fujita et al. ............... 210/96.1 |

(Continued)

FOREIGN PATENT DOCUMENTS

JP  9-33479  2/1997

(Continued)

*Primary Examiner*—Frank M. Lawrence
(74) *Attorney, Agent, or Firm*—Rabin & Berdo, PC

(57) ABSTRACT

A water treating device includes a water container for containing water; an electrolyzing chamber for sterilizing water; a water treatment line which couples the electrolyzing chamber with the water container; a sensor for measuring residual chlorine concentration; and a device for controlling the amount of the water to be electrochemically decomposed in the electrolyzing chamber on the basis of the residual chlorine concentration measured by the sensor to keep the residual chlorine concentration of the water to be fed back into the water container within a predetermined range. A bypass line is provided which is branched from the water treatment line upstream of the electrolyzing chamber for sampling the water, introducing the sampled water into the sensor for the measurement of the residual chlorine concentration thereof, and discharging the sampled water into the electrolyzing chamber after the measurement.

13 Claims, 9 Drawing Sheets

U.S. PATENT DOCUMENTS 6,627,073 B1 * 9/2003 Hirota et al. ............... 210/169
6,814,858 B1 * 11/2004 Yamamoto et al. ......... 210/169

FOREIGN PATENT DOCUMENTS

| JP | 9-189141 | 7/1997 |
| JP | 11-90447 | 4/1999 |
| JP | 11-132560 | 5/1999 |
| JP | 2000-46795 | 2/2000 |
| JP | 3069296 | 3/2000 |
| JP | 2001-62453 | 3/2001 |

* cited by examiner

WATER TREATING DEVICE

TECHNICAL FIELD

The present invention relates to a novel water treating device which is capable of sterilizing water contained in various types of water containers ranging from large-scale water containers such as swimming pools and bathing pools in bathhouses to medium-scale water containers such as water supply tanks on building rooftops and small-scale water containers such as bathtubs for general domestic use.

PRIOR ART

To maintain the quality of water in indoor and outdoor swimming pools or in bathing pools in hotels and public bathhouses, for example, the water is periodically sterilized by adding so-called chlorinated lime (bleaching powder or high-concentration bleaching powder) or an aqueous solution of sodium hypochlorite (NaClO) to the water in the pools.

Conventionally, this operation is manually performed by workers in a swimming pool or a bathhouse. In addition, the chlorinated lime and the sodium hypochlorite aqueous solution are irritating, so that careful attention should be paid when the operation is performed in business hours. Thus, there is a problem that greater efforts are required for the operation. Furthermore, the chlorinated lime is in a solid powdery form, so that it takes some time for homogeneous dissolution of the chlorinated lime after the addition thereof. Thus, there is a problem that the swimming or bathing pool is not available until the completion of the dissolution.

In the case of water supply tanks on building rooftops and bathtubs for general domestic use, the water sterilization currently relies only on a sterilizing capability of chlorine ions contained in tap water without the addition of chlorinated lime or sodium hypochlorite. Therefore, some of the water supply tanks are found to have a deteriorated water quality due to proliferation of algae.

For a domestic-use bathtub, the water is generally changed everyday or every second day and, hence, there is seemingly no problem associated with the water quality. However, the interior of the boiler connected to the bathtub cannot frequently be cleaned, so that germs and mold are liable to proliferate. Accordingly, there is the fear of the deterioration of the water quality in the bathtub.

The inventor of the present invention previously invented a water treating device which is adapted to introduce to-be-treated water into an electrolyzing chamber from any of the aforesaid various water containers and sterilize the water by way of an electrochemical reaction (see Japanese Patent Application No. HEI 11-357938).

In the water treating device of the preceding invention, the to-be-treated water is supplied into the electrolyzing chamber having electrodes, and subjected to the electrochemical reaction (so-called electrolysis) Chlorine gas, hypochlorous acid (HClO), hypochlorite ions and the like are generated through the electrochemical reaction, and dissolved in the to-be-treated water, whereby the to-be-treated water is sterilized.

In the water treating device of the preceding invention, a branch water path is provided for sampling the to-be-treated water before the water is introduced into the electrolyzing chamber, and a residual chlorine sensor is provided in the branch water path for measuring the residual chlorine concentration of the to-be-treated water. The water having passed through the residual chlorine sensor is drained into a water drainage.

The residual chlorine sensor has a very small intake capacity and, hence, should be provided in the dedicated branch water path. Further, a very small amount of the water flows through the branch water path, so that the amount of waste water drained into the water drainage is very small. This is why the residual chlorine sensor is provided in the branch water path and the water subjected to the measurement of the residual chlorine concentration is drained into the water drainage but not into a water path.

However, the measurement of the residual chlorine concentration is constantly performed during the operation of the water treating device and, therefore, the waste water is constantly produced during the operation, resulting in poorer economy. Accordingly, there is a demand for modifying the construction so as not to produce the waste water.

In the case of the domestic-use bathtub which has a smaller volume than the swimming pool or the like, the amount of the waste water resulting from the measurement of the residual chlorine concentration is not negligible.

In the water treating device of the preceding invention, a float switch is provided for controlling the level of the to-be-treated water in the electrolyzing chamber within a constant range, and the amount of the water to be introduced into the electrolyzing chamber is controlled.

The float switch has a float which is vertically slidable according to a change in the water level. The float has a permanent magnet, so that the vertical position of the permanent magnet (float) is detected by a sensor which senses the magnetism of the permanent magnet.

When minute air bubbles generated by the electrolysis rise toward the surface of the to-be-treated water and break on the water surface, the to-be-treated water are scattered to reach a sliding member of the float, and fatty components contained in the to-be-treated water and chlorine compounds contained in an electrolytic solution are liable to adhere to the sliding member of the float. This may hinder the sliding of the float, and possibly cause erroneous detection of the water level due to a sliding failure.

When the float switch malfunctions, the water level in the electrolyzing chamber cannot be controlled within the predetermined range, so that the to-be-treated water overflows the electrolyzing chamber, resulting in a short circuit and electric leakage. Particularly, where the to-be-treated water contains the chlorine compounds in a high concentration, there is the fear of a problem associated with corrosion due to the overflowing to-be-treated water.

Further, ON and OFF points of the float switch for the water level detection are located at substantially the same positions, so that a pump for introducing the to-be-treated water into the electrolyzing chamber is switched at shorter ON/OFF intervals. This may reduce the service lives of the pump and drivers such as an electromagnetic switch for driving the pump.

SUMMARY OF THE INVENTION

It is an object of the present invention to provide a novel water treating device which is capable of safely and properly performing a sterilizing process to solve the aforesaid problems.

In accordance with an inventive aspect of the invention, there is provided a water treating device, which comprises: a water container for containing water to be treated; an electrolyzing chamber for sterilizing the to-be-treated water by way of electrochemical decomposition by energization of an electrode set consisting of at least two electrode plates; a water treatment line through which the to-be-treated water is introduced into the electrolyzing chamber from the water container and fed back into the water container after the sterilization of the water in the electrolyzing chamber; a residual chlorine sensor for measuring the residual chlorine concentration of the to-be-treated water before the water is introduced into the electrolyzing chamber; and control means for controlling the amount of the to-be-treated water to be subjected to the electrochemical decomposition in the electrolyzing chamber on the basis of the residual chlorine concentration measured by the residual chlorine sensor to keep the residual chlorine concentration of the water to be fed back into the water container within a predetermined range; wherein a bypass line is provided which is branched from the water treatment line at a position upstream of the electrolyzing chamber for sampling the to-be-treated water, introducing the sampled to-be-treated water into the residual chlorine sensor for the measurement of the residual chlorine concentration of the sampled to-be-treated water, and discharging the sampled to-be-treated water into the electrolyzing chamber after the measurement.

In accordance with another inventive aspect of the invention, the residual chlorine sensor is located at a position upper than the electrolyzing chamber in the bypass line in the water treating device.

In accordance with another inventive aspect of the invention, there is provided a water treating device, which comprises: a water container for containing water to be treated; an electrolyzing chamber for causing electrochemical decomposition by energization of an electrode set consisting of at least two electrode plates; a feed line for filling the electrolyzing chamber with an electrolytic solution containing chlorine ions and having a function of promoting the electrochemical decomposition and, in this state, producing a sterilizing liquid having a sterilizing capability by way of electrolysis of the electrolytic solution by the energization of the electrode set, and supplying the produced sterilizing liquid into the water container; a residual chlorine sensor for measuring the residual chlorine concentration of the to-be-treated water; and introduction amount controlling means for controlling the amount of the sterilizing liquid to be introduced into the water container on the basis of the residual chlorine concentration of the to-be-treated water measured by the residual chlorine sensor; wherein a bypass line is provided which is connected to the water container for introducing the to-be-treated water into the residual chlorine sensor from the water container for the measurement of the residual chlorine concentration of the to-be-treated water, and feeding the introduced to-be-treated water back into the water container after the measurement.

In accordance with a further inventive aspect of the invention, a filter device for filtering the to-be-treated water taken out of the water container and a constant flow rate valve for controlling the flow rate of the to-be-treated water filtered by the filter device at a substantially constant level are provided upstream of the residual chlorine sensor in the water treating device.

In accordance with a further inventive aspect of the invention, the residual chlorine sensor is a residual chlorine sensor of in-line type in the water treating device.

In accordance with an inventive aspect of the invention, there is provided a water treating device, which comprises: a water container for containing water to be treated; an electrolyzing chamber for causing electrochemical decomposition by energization of an electrode set consisting of at least two electrode plates; a water treatment line through which the to-be-treated water is introduced into the electrolyzing chamber from the water container and fed back into the water container after sterilization of the water by the electrochemical decomposition in the electrolyzing chamber; water level detecting means for detecting a water level in the electrolyzing chamber; and water level controlling means for controlling the amount of the to-be-treated water to be introduced into the electrolyzing chamber on the basis of water level data from the water level detecting means to keep the water level in the electrolyzing chamber at a predetermined level; wherein the water level detecting means has at least two electrodes disposed in spaced opposed relation and is adapted to detect the water level on the basis of whether an electric current flows between the electrodes.

In accordance with another inventive aspect of the invention, there is provided a water treating device, which comprises: a water container for containing water to be treated; an electrolyzing chamber for causing electrochemical decomposition by energization of an electrode set consisting of at least two electrode plates; a feed line for filling the electrolyzing chamber with an electrolytic container containing chlorine ions and having a function of promoting an electrochemical reaction and, in this state, producing a sterilizing liquid having a sterilizing capability by way of the electrochemical decomposition of the electrolytic solution by the energization of the electrode set, and supplying the produced sterilizing liquid into the water container; water level detecting means for detecting a water level in the electrolyzing chamber; and water level controlling means for controlling the amount of the sterilizing liquid to be introduced into the electrolyzing chamber on the basis of water level data from the water level detecting means to keep the water level in the electrolyzing chamber at a predetermined level; wherein the water level detecting means has at least two electrodes disposed in spaced opposed relation and is adapted to detect the water level on the basis of whether an electric current flows between the electrodes.

In accordance with a further inventive aspect of the invention, the electrolyzing chamber comprises a tank for storing therein the produced sterilizing liquid and feeding the stored sterilizing liquid back into the water container as required, and the water level controlling means controls the amount of the sterilizing liquid to be produced in the electrolyzing chamber on the basis of the data from the water level detecting means to keep the level of the sterilizing liquid stored in the tank at a predetermined level in the water treating device.

In accordance with an inventive aspect of the invention, the water level detecting means is disposed in a space other than an inter-electrode space in the electrolyzing chamber in the water treating device.

In accordance with an inventive aspect of the invention, a resin separator for separating the electrode plates of the electrolyzing chamber from the electrodes of the water level detecting means is disposed between the electrode plates and the electrodes in the water treating device.

In accordance with an inventive aspect of the invention, the electrodes of the water level detecting means are composed of a metal of titanium or a titanium alloy in the water treating device.

With this arrangement, the to-be-treated water subjected to the measurement of the residual chlorine concentration in the bypass line is returned into the electrolyzing chamber, so that no waste water is produced. The to-be-treated water returned into the electrolyzing chamber is sterilized in the electrolyzing chamber and, thereafter, fed back into the water container. Therefore, water yet to be sterilized is not fed back into the water container.

The to-be-treated water can flow into the electrolyzing chamber by gravity after the residual chlorine concentration thereof is measured by the residual chlorine sensor. Therefore, the to-be-treated water is returned into the electrolyzing chamber without the use of a pump or the like, so that the costs of the system can be reduced.

The residual chlorine concentration of the to-be-treated water can be measured on a real-time basis in the water treating device employing the batch-type electrolyzing chamber. Further, the water is fed back into the water container after the measurement of the residual chlorine concentration, so that water saving can be achieved without the production of the waste water which may be entailed in the prior art. This arrangement is particularly effective in the case of a domestic-use bathtub which has a smaller volume than a swimming pool or the like.

The residual chlorine sensor of in-line type can be employed, so that a position at which the residual chlorine sensor is installed can more flexibly be determined.

The water level may be detected on the basis of whether the electric current flows between the electrodes. Therefore, erroneous detection of the water level is less liable to occur in the absence of a movable member such as a conventional float switch.

Where the number of the electrodes of the water level detecting means is increased to three or more, a plurality of water level detecting positions can be set. Thus, the water level can be controlled more precisely.

Adverse effects on the electrodes of the water level detecting means and malfunction of the water level detecting means are prevented with the invention, which may otherwise occur due to the electric current flowing between the electrodes for the electrolysis, thereby ensuring accurate measurement of the water level.

The corrosion of the electrodes can drastically be retarded as compared with a case where the electrodes are composed of stainless steel or iron. Therefore, the electrodes are free from replacement for a long period of time.

EMBODIMENTS OF THE INVENTION

Figure 1:
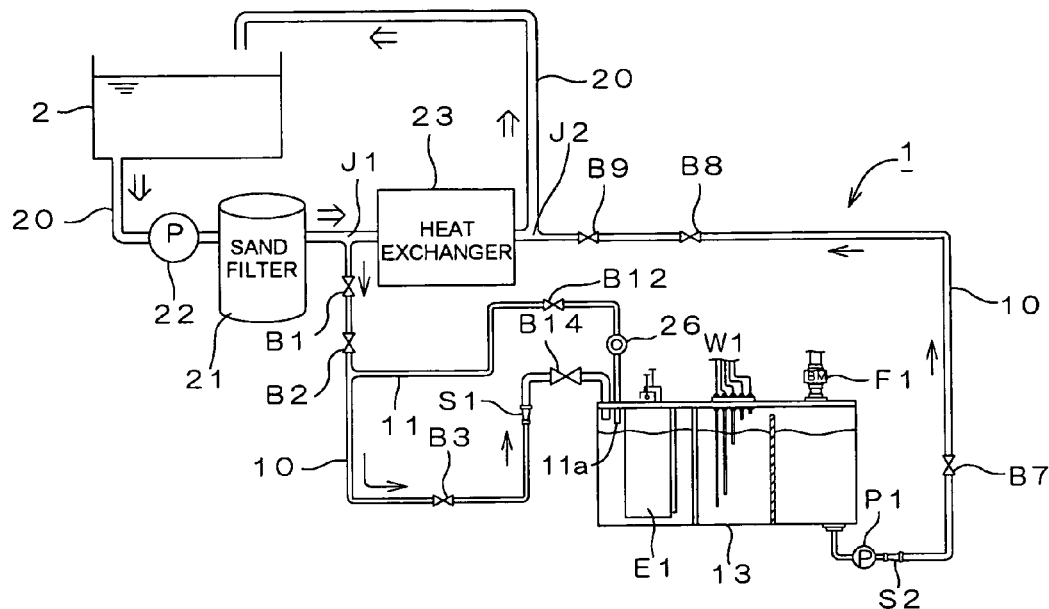
FIG. 1 is a diagram schematically illustrating a water treating device according to a first embodiment of the present invention.

FIG. 1 is a diagram schematically illustrating the construction of a water treating device 1 incorporated in a large-scale water container 2 such as a swimming pool or a bathing pool in a bathhouse in accordance with a first embodiment of the present invention.

Referring to FIG. 1, the water container 2 is provided with a main circulation line 20. The main circulation line 20 is provided with a circulation pump 22. Water is pumped out of the water container 2, circulated in a direction indicated by double-line arrows in the main circulation line 20, and fed back into the water container 2 by the circulation pump 22. A filter 21 for sand filtration of organic substances and a heat exchanger 23 for heating and cooling the circulated water are disposed downstream of the circulation pump 22 in the main circulation path 20.

A water treatment line 10 is diverged from the main circulation line 20 at a branch J1 located downstream of the filter 21 and upstream of the heat exchanger 23. The water treatment line 10 joins the main circulation line 20 at a junction J2 located downstream of the heat exchanger 23.

An air/liquid separation chamber 13 and the following devices are provided in the midst of the water treatment line 10. A stop valve B1, regulation valves B2, B3 for flow rate regulation, a flow rate meter S1, and an electromagnetic valve B4 are disposed in this order in a path extending from the branch J1 to the air/liquid separation chamber 13.

A feed pump P1 for circulating to-be-treated water in the water treatment line 10, a flow rate meter S4, a regulation valve B7, a check valve B8 for prevention of back flow, and a regulation valve B9 for flow rate regulation are disposed in this order downstream of the air/liquid separation chamber 13 toward the junction J2 in the water treatment line 10.

A bypass line 11 is diverged from the water treatment line 10 at a position between the regulation valves B2 and B3. The to-be-treated water flowing in a direction indicated by solid-line arrows in the water treatment line 10 is partly permitted to flow into the bypass line 11. A regulation valve B12 for flow rate regulation, and a residual chlorine sensor 26 for measuring a residual chlorine concentration are disposed in this order in the bypass line 11. An end portion 11a of the bypass line 11 extending downstream of the residual chlorine sensor 26 serves as a drain port, which communicates with a space above a water surface in the air/liquid separation chamber 13. Thus, the to-be-treated water discharged from the drain port 11a is exposed to the atmosphere, and discharged into the air/liquid separation chamber 13.

Figure 2:
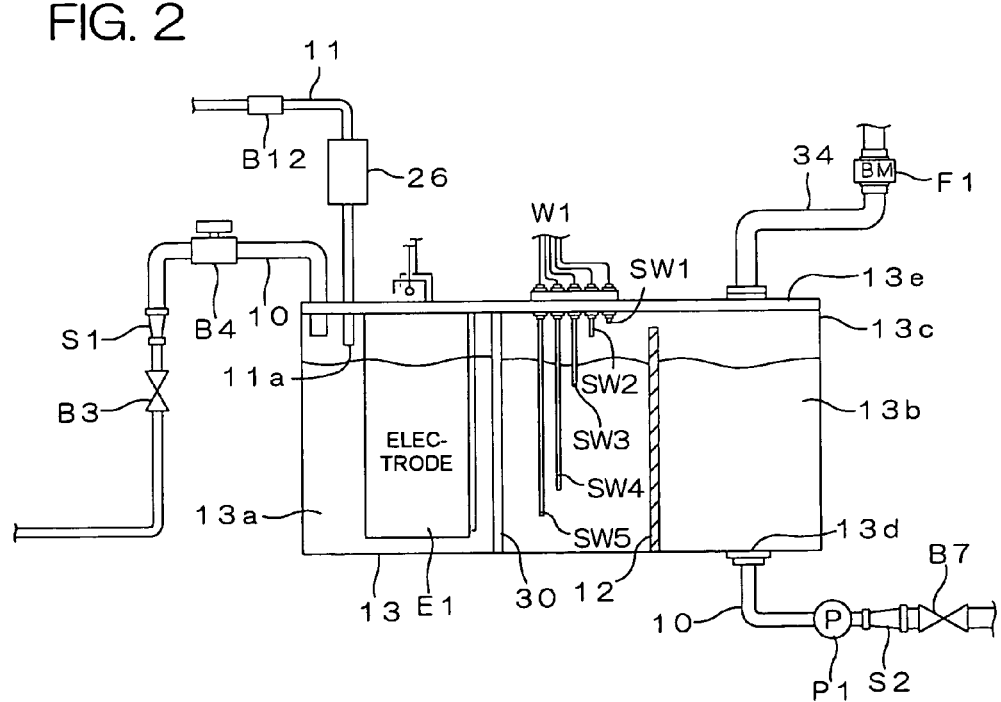
FIG. 2 is a schematic sectional view of an air/liquid separation chamber which is a major portion of the water treating device according to the first embodiment of the present invention.
Figure 3:
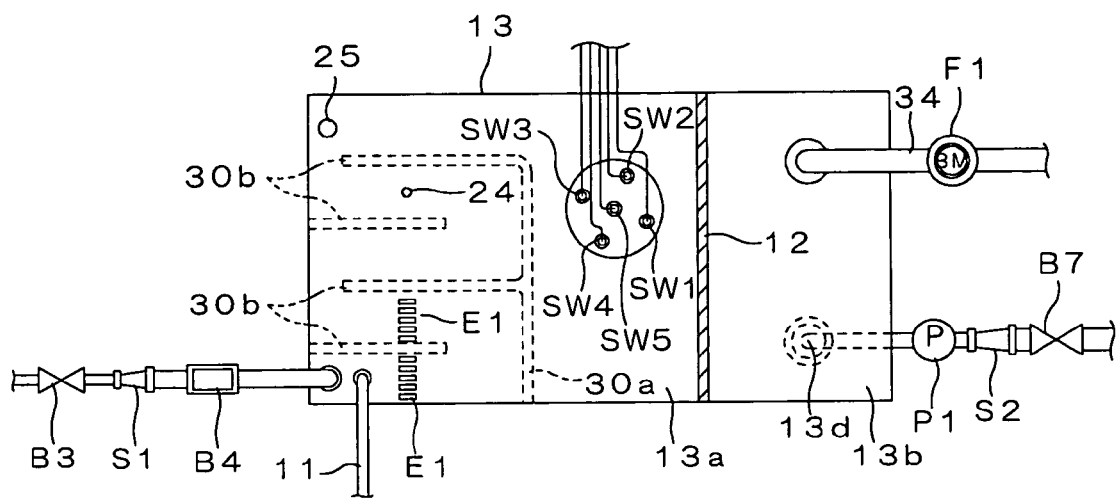
FIG. 3 is a schematic top view of the air/liquid separation chamber which is the major portion of the water treating device according to the first embodiment of the present invention.

Referring to FIGS. 2 and 3, an explanation will be given to the construction of the air/liquid separation chamber 13.

The box-shaped air/liquid separation chamber 13 has a cover 13e which covers an open top 13c of the air/liquid separation chamber 13. A filter 12 for removal of minute air bubbles is disposed within the air/liquid separation chamber 13 to divide the air/liquid separation chamber 13 into a region 13a and a region 13b. An electrode set E1 consisting of a plurality of electrode plates is disposed in the region 13a on an upstream side. The region 13a in which the electrode set E1 is disposed serves as an electrolyzing chamber for an electrochemical reaction.

Further, a water level sensor W1 is provided in the region 13a. A separator 30 separates the electrode set E1 from the water level sensor W1. The separator 30 is composed of a resin such as of vinyl chloride or polypropylene, and includes a separation plate 30a disposed between the electrode set E1 and the water level sensor W1 to divide the region into two regions with a margin left on one side as a water passage, and a plurality of separation plates 30b disposed perpendicularly to the separation plate 30a in staggered parallel relation in the region where the electrode set E1 is disposed. The separator 30 (30a and 30b) prevents malfunction of the water level sensor W1, which may otherwise occur when an electric current flowing through the electrode set E1 reaches electrode rods of the water level sensor W1 because the electrode set E1 is disposed on the upstream side and the water level sensor W1 is disposed on the downstream side.

An electrical conductivity sensor 24 and a PH sensor 25 attached to the cover 13e are located in the region 13a. The electrical conductivity sensor 24 and the PH sensor 25 are separated from the electrode set E1 by the separation plates 30b. Thus, the electric current flowing through the electrode set E1 is prevented from reaching the electrical conductivity sensor 24 or the PH sensor 25 for prevention of adverse effects on detection capabilities of the sensors.

The water level sensor W1 includes, for example, five electrode rods SW1 to SW 5 having different lengths. The electrode rod SW5 is a common electrode rod located at the lowermost position in the air/liquid separation chamber 13. The electrode rod SW4 is an electrode rod for detection of a water level for giving an alarm on abnormal water shortage, and the electrode rod SW3 is an electrode rod for detecting a lower limit water level for clearing the alarm on the abnormal water shortage. The electrode rod SW2 is an electrode rod for detecting an upper limit water level, and the electrode rod SW 1 is an electrode rod for detecting a water level for giving an alarm on an abnormal water full state.

The electrode rod SW1 is located at a position upper than the electrode rod SW2 for detecting the upper limit water level so as to sense that the water level in the air/liquid separation chamber 13 exceeds the upper limit water level due to some abnormality of the system. The electrode rod SW4 is located at a position lower than the electrode rod SW3 for detecting the lower limit water level so as to sense that the water level is lowered below the lower limit water level due to some abnormality of the system.

The electrode rods SW1 to SW5 of the water sensor W1 are preferably composed of a material such as titanium (Ti) or a titanium alloy which has corrosion resistance with respect to hypochlorous acid and hypochlorite ions contained in the electrolyzed water.

The water level sensor W1 is attached to a central portion of the cover 13e, and the five electrode rods SW1 to SW5 extend into the air/liquid separation chamber 13.

A constant voltage or a constant electric current is supplied to the common electrode SW5 from a power supply not shown, and a detection section not shown is connected to the electrode rods SW1 to SW4. When the electrode rod SW4 is submerged in the water, for example, the electrode rod SW5 and the electrode rod SW4 are electrically connected to each other via an electric resistance of the water. As a result, the detection section senses that the water level is reached, on the basis of a fact that the detected electric current or voltage of the electrode rod SW4 reaches a level greater than a reference value.

On the basis of the level of the to-be-treated water in the region 13a detected by the water level sensor W1, the opening and closing of the stop valve B1 and the flow rate regulation at the regulation valve B2 are controlled, whereby the amount of the to-be-treated water to be introduced into the air/liquid separation chamber 13 is controlled. Further, the flow rate of the to-be-treated water fed by the feed pump P1 is controlled to keep the level of the to-be-treated water in the region 13a at a predetermined water level.

The to-be-treated water flowing in the water treatment line 10 passes through the electromagnetic valve B4, and then flows through the cover 13e into the region 13a in which the electrode set E1 is disposed.

The to-be-treated water flowing in the bypass line 11 and the residual chlorine sensor 26 also flows through the cover 13e into the region 13a in which the electrode set E1 is disposed. A port of the water treatment line 10 and the open end portion 11a of the bypass line 11 are disposed above a normal water surface in the region 13a, so that the to-be-treated water is exposed to the atmosphere and then flows into the region 13a.

An outlet port 13d is provided in the bottom of the downstream region 13b of the air/liquid separation chamber 13 separated by the filter 12, and connected to the water treatment line 10.

On the other hand, an exhaust pipe 34 is connected to a portion of the cover 13e covering the region 13b. A blower F1 of suction type is provided in the exhaust pipe 34. By driving the blower F1, gas resulting from the minute air bubbles removed from the treated water by the filter 12 is forcibly expelled through the exhaust pipe 34.

An air introduction port not shown is provided in a portion of the cover 13e covering the region 13a for introducing air into the air/liquid separation chamber 13 in place of the gas expelled from the air/liquid separation chamber 13.

Figure 4:
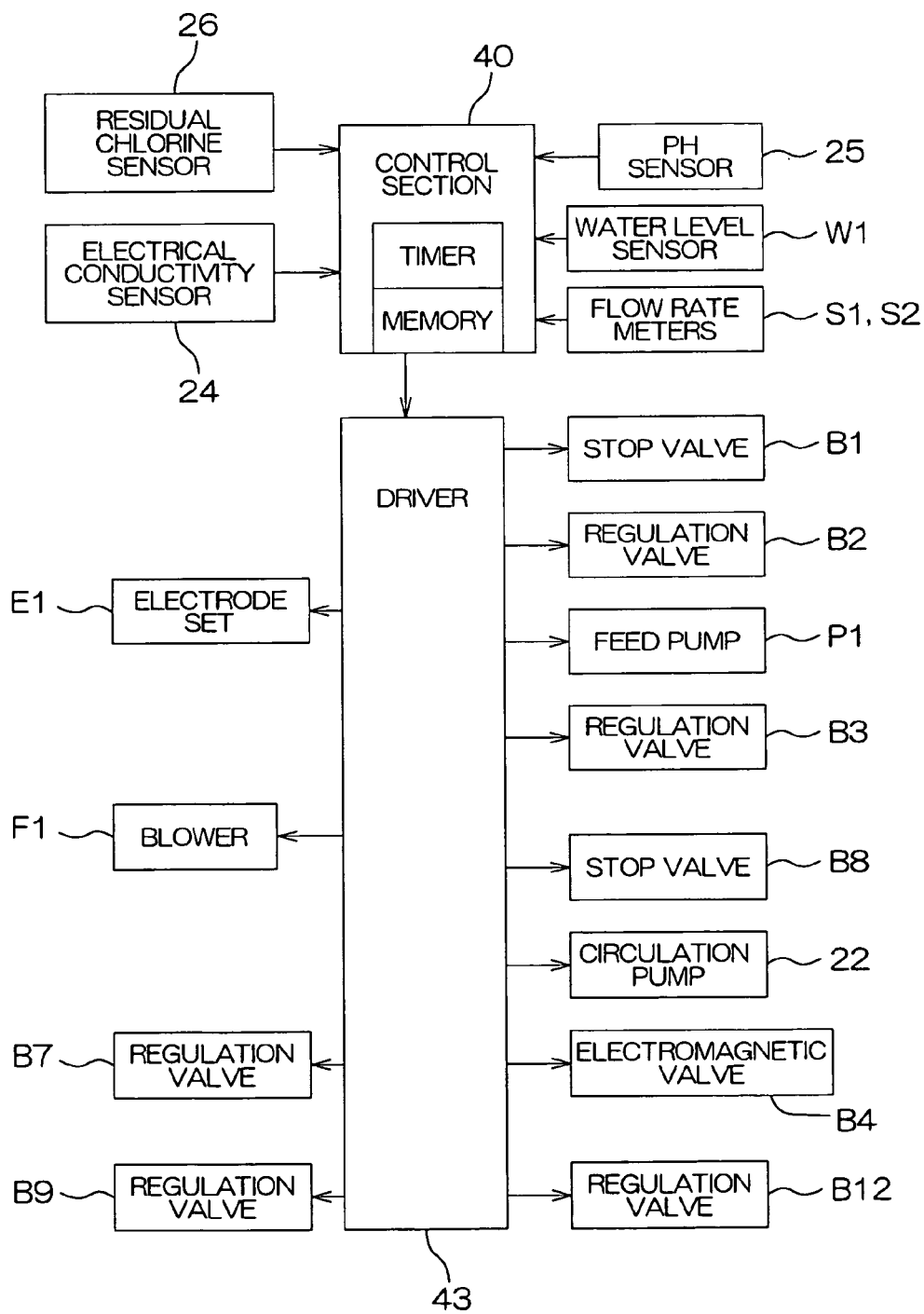
FIG. 4 is a block diagram illustrating the electrical construction of the water treating device according to the first embodiment of the present invention.

FIG. 4 is a block diagram illustrating the electrical construction of the water treating device shown in FIG. 1. The water treating device includes a control section 40 comprised of a microprocessor. Outputs of the residual chlorine sensor 26, the electrical conductivity sensor 24, the PH sensor 25 and the water level sensor W1 and outputs of the flow rate meters S1, S2 are applied to the control section 40. A memory and a timer are provided in the control section.

The control section 40 controls the operation of the water treating device on the basis of detection signals applied thereto from the respective sensors and the flow rate meters in accordance with a predetermined operation program. More specifically, control signals are applied to a driver 43. On the basis of the applied signals, the driver 43 controls an electric current level to be applied to the electrode set E1 and an energization period. Further, the driver controls the opening/closing and regulating operations of the respective valves B1, B2, B3, B4, B7, B8, B9, B12, the driving of the circulation pump 22 and the feed pump P1, and the driving of the blower F1.

Referring again to FIG. 2, the circulation pump 22 is first actuated, and a great amount of the to-be-treated water is constantly circulated in the main circulation line 20 as shown by the double-line arrows for sterilization of the to-be-treated water in the water container 2 in the water treating device 1. At the same time, the feed pump P1 is actuated, and all the valves B1, B2, B3, B4, B7, B8, B9, B12 are opened. Thus, a part of the to-be-treated water circulated in the main circulation line 20 flows into the water treatment line 10. The flow rate of the to-be-treated water is regulated through the regulation valves B2, B3, and measured by the flow rate meter S1. The to-be-treated water having the flow rate regulated by the regulation valves B2, B12 is supplied into the residual chlorine sensor 26 for the measurement of the residual chlorine concentration. The flow rates at the regulation valves B2, B3 are controlled according to the flow rate measured by the flow rate meter S1.

The to-be-treated water having passed through the electromagnetic valve B4 is introduced into the upstream region 13a of the air/liquid separation chamber 13, and electrolyzed by the electrode set E1 in the region 13a. The energization of the electrode set E1 is controlled on the basis of the residual chlorine concentration measured by the residual chlorine sensor 26. The water sterilized through the electrochemical reaction is fed into the downstream region 13b through the filter 12. At this time, the minute air bubbles are removed by the filter 12, whereby apparently clear and clean water is obtained.

The gas resulting from the minute air bubbles removed from the treated water at the passage through the filter 12 is expelled from the chamber through the exhaust pipe 34 by the driving of the blower F1.

The water sterilized and freed from the minute air bubbles flows out of the outlet port 13d into the water treatment line 10 by the action of the feed pump P1, and passes through the flow rate meter S4, the regulation valve B7, the check valve B8 and the regulation valve B9 thereby to be returned into the main circulation line 20 at the junction J2. Thus, the water is fed back into the water container 2.

Next, an explanation will be given to the construction of the residual chlorine sensor 26.

Figure 5:
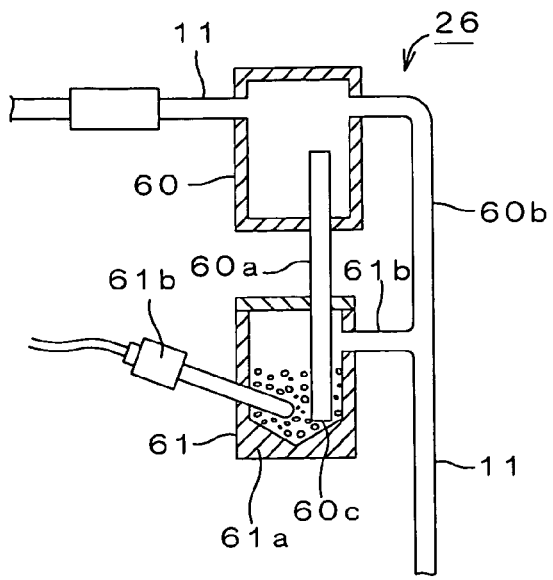
FIG. 5 is a schematic sectional view of a residual chlorine sensor employed in the water treating device according to the first embodiment of the present invention.

FIG. 5 is a diagram schematically illustrating the construction of the residual chlorine sensor 26 employed in the water treating device of FIG. 1. The residual chlorine sensor 26 has an overflow chamber 60 and an electrode device 61. The bypass line 11 diverged from the water treatment line 10 is connected to the overflow chamber 60 via the regulation valve 12. A feed pipe 60a is connected to the overflow chamber 60, so that the to-be-treated water supplied into the overflow chamber 60 is further supplied into the electrode device 61 through the feed pipe 60a. A drain pipe 60b is connected to the overflow chamber 60, so that the to-be-treated water not flowing into the supply pipe 60b in the overflow chamber 60 flows into the drain pipe 60b. That is, the to-be-treated water overflowing the overflow chamber 60 flows out of the overflow chamber 60 through the drain pipe 60b, and is introduced through the bypass line 11 into the air/liquid separation chamber 13 provided below the overflow chamber.

The electrode device 61 has a housing 61a and an electrode 61b disposed in the housing 61a. The feed pipe 60a connected to the overflow chamber 60 is inserted in the housing 61a, and the lowermost outlet port 60c is located in the vicinity of a distal end of the electrode 61b at the bottom of the housing 61a. Further, an outlet pipe 61b is connected to a side wall of the housing 61b. The outlet pipe 61b is connected to the drain pipe 60b, and further connected to the bypass line 11.

The to-be-treated water supplied from the overflow chamber 60 through the feed pipe 60a is accumulated in the housing 61a. The water comes into contact with the distal end of the electrode 61b, then falls into the bypass line 11 through the outlet pipe 61b by gravity, and flows into the air/liquid separation chamber 13. At this time, the residual chlorine concentration of the to-be-treated water is measured by the electrode 61b.

With the use of the electrode 61b, the residual chlorine concentration is measured by a polarography method. For the measurement by the polarography method, a detection electrode (gold electrode) and a counter electrode (silver-silver chloride electrode) not shown are disposed in opposed relation in the to-be-treated water, and a voltage is externally applied between the electrodes. This method is based on a fact that an electric current flowing between the detection electrode and the counter electrode according to the voltage is proportional to the residual chlorine concentration. By this method, the residual chlorine concentration of the to-be-treated water is determined on the basis of the value of the electric current flowing between the electrodes.

Figure 6:
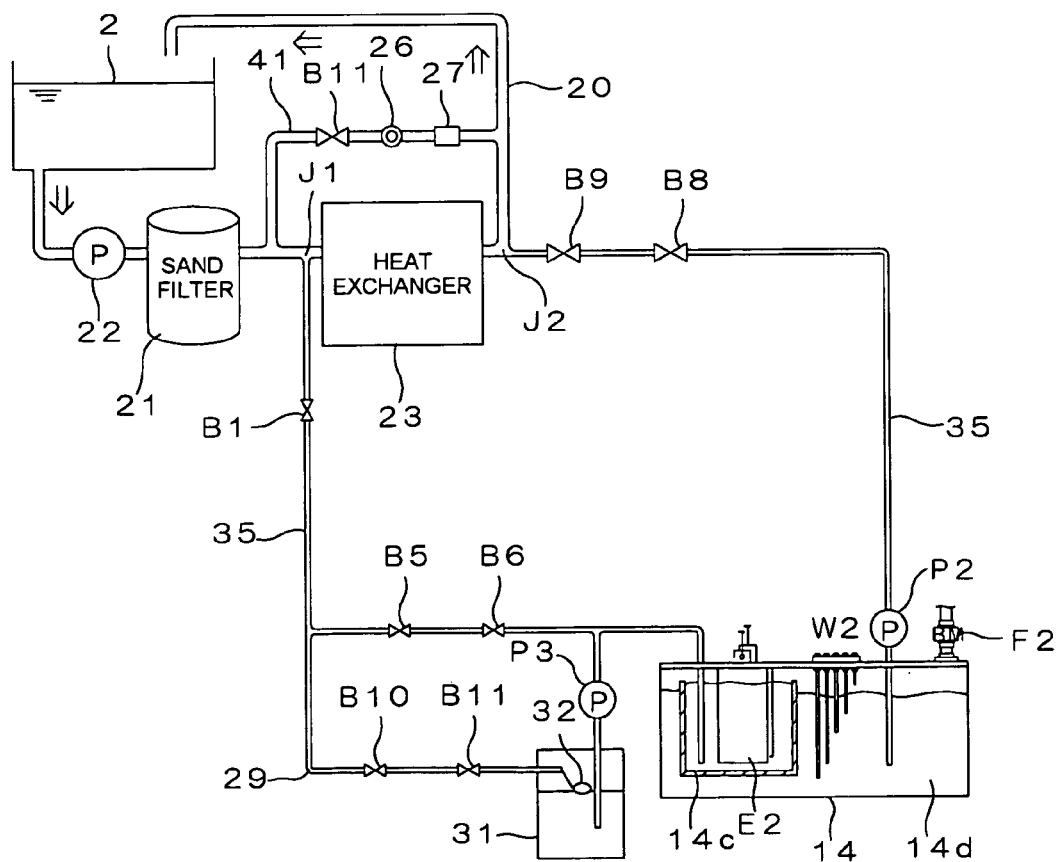
FIG. 6 is a diagram schematically illustrating a water treating device according to a second embodiment of the present invention.

Although the explanation has been given to the construction of the residual chlorine sensor 26 based on the polarography method suitable for long-term continuous measurement, the residual chlorine sensor is not limited thereto. For example, a residual chlorine meter for continuous measurement by a galvanic electrode method or a spectrophotometric method may be employed FIG. 6 is a diagram illustrating the construction of a water treating device according to a second embodiment of the present invention. The water treating device according to the second embodiment is different from the water treating device according to the first embodiment in that a batch process electrolyzing chamber 14 is provided in place of the air/liquid separation chamber 13.

An electrode set E2 consisting of a plurality of electrode plates is provided in the batch process electrolyzing chamber 14. The batch process electrolyzing chamber 14 is filled with an electrolytic solution containing chlorine ions such as afforded by salt and having a function of promoting an electrochemical reaction and, in this state, the electrolytic solution is electrolyzed for a certain period of time by energization of the electrode set E2, whereby a sterilizing liquid having a sterilizing capability is produced. The sterilizing liquid thus produced is stored in a reservoir tank 14d, and supplied from the reservoir tank 14d to a main circulation line 20 through a feed line 35 as required.

The construction will more specifically be described. The feed line 35 is diverged at a branch J1 from the main circulation line 20 for circulating to-be-treated water from a water container 2. The feed line joins the main circulation line 20 at a junction J2 downstream of a heat exchanger 23. A stop valve B1, a regulation valve B5, an electromagnetic valve B6, the batch process electrolyzing chamber 14, a feed pump P2, a check valve B8 and a regulation valve B9 are provided in this order in the direction of the flow of the to-be-treated water in the feed line 35.

Further, a salt water tank 31 storing therein the electrolytic solution, e.g., saturated salt water, is connected to the feed line 35 at a position between the electromagnetic valve B6 and the batch process electrolyzing chamber 14 via a metering pump P3. A water feed line 29 diverged from the feed line 35 at a position between the stop valve B1 and the regulation valve B5 is connected to the salt water tank 31. A regulation valve B10 and an electromagnetic valve B11 are provided in the water feed line 29. A float switch 32 is provided in the salt water tank 31. The electromagnetic valve B11 is opened and closed on the basis of the switching of the float switch 32, whereby the to-be-treated water is supplied into the salt water tank 31 via the water feed line 29 to constantly store the salt water at a predetermined water level.

A bypass line 41 is diverged from the main circulation line 20 at a position between a filter 21 and the heat exchanger 23. The bypass line 41 joins the main circulation line 20 downstream of the junction J2. A constant flow rate valve B11, a residual chlorine sensor 26 and a flow switch 27 are disposed in this order in the direction of the flow of the to-be-treated water in the bypass line 41. The constant flow rate valve B11 controls the flow rate of the to-be-treated water supplied into the residual chlorine sensor 26 at a constant level. The flow switch 27 senses whether the to-be-treated water flows in the bypass line 41.

Figure 7:
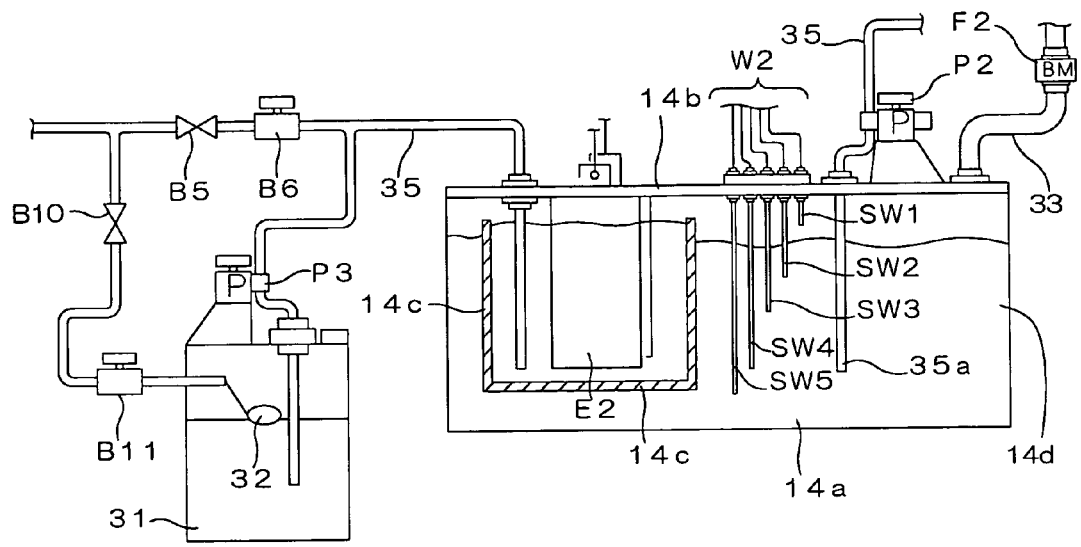
FIG. 7 is a schematic sectional view of a batch process electrolyzing chamber which is a major portion of the water treating device according to the second embodiment of the present invention.
Figure 8:
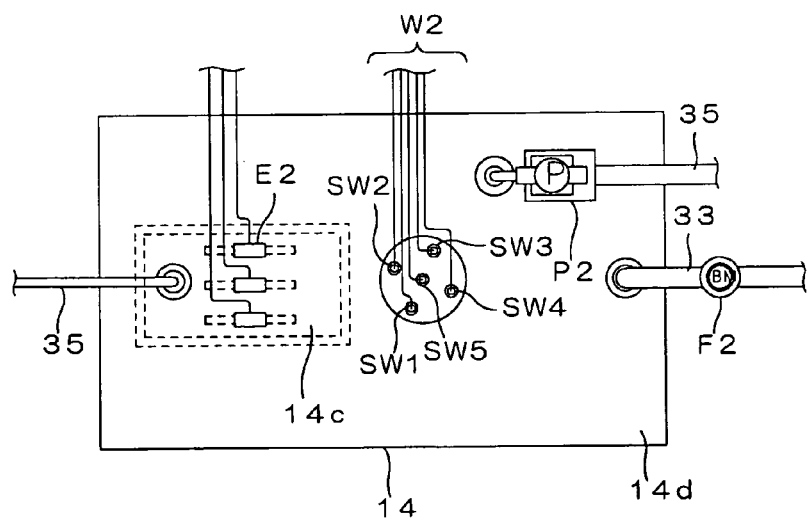
FIG. 8 is a schematic top view of the batch process electrolyzing chamber which is the major portion of the water treating device according to the second embodiment of the present invention.

FIG. 7 is a schematic sectional view for explaining the construction of the batch process electrolyzing chamber 14. FIG. 8 is a schematic top view for explaining the construction of the batch process electrolyzing chamber 14. The batch process electrolyzing chamber 14 includes a box-shaped case body 14a and a cover 14b which covers an open top of the case body 14a. A square resin box is separately provided as an electrolyzing chamber 14c in the case body 14a. A space exclusive of the electrolyzing chamber 14c in the case body 14a serves as a reservoir tank 14d for storing the sterilizing liquid produced in the electrolyzing chamber 14c.

The electrode set E2 consisting of the plurality of electrode plates are provided in the electrolyzing chamber 14c. An end of the feed line 35 is inserted in the electrolyzing chamber 14c through the cover 14b, so that the electrolytic solution obtained by mixing the saturated salt water pumped out of the salt water tank 31 with the to-be-treated water supplied from the feed line 35 is supplied into the electrolyzing chamber 14c.

The concentration of the electrolytic solution to be supplied into the electrolyzing chamber 14c is determined on the basis of the value of an electric current flowing through the electrode set E2. The concentration of the electrolytic solution is adjusted at an optimum level by controlling the flow rate at the metering pump P3 for pumping out the saturated salt water and the opening and closing of the electromagnetic valve B6 for supplying the to-be-treated water for dilution. Thus, the electrolysis by the electrode set E2 is controlled to be performed most effectively.

In the case body 14a serving as the reservoir tank 14d, a suction port 35a provided at an end of a latter half of the feed line 35 is located at the bottom of the reservoir tank 14d. The feed pump P2 is provided in the midst of the feed line 35.

A water level sensor W2 required for controlling the level of the sterilizing liquid in the reservoir tank 14d within a predetermined range is attached to a central portion of the cover 14b. The water level sensor W2 has a plurality of electrode rods SW1 to SW5 extending downward from the cover 14b. The water level sensor W has the same construction as the water level sensor W1 provided in the air/liquid separation chamber 13 described in the first embodiment. Therefore, like components disposed in like positions are denoted by like reference characters, and no explanation will be given thereto.

The cover 14b has an exhaust pipe 33 for forcibly expelling gas generated by the electrolysis in the electrolyzing chamber 14c from the case body 14a. A blower F2 is inserted in the exhaust pipe 33, so that the gas is sucked out through the exhaust pipe 33 by driving the blower F2.

In the electrolyzing chamber 14c, the supplied electrolytic solution is electrolyzed to produce the sterilizing liquid in which hypochlorous acid and hypochlorite ions are dissolved. The sterilizing liquid thus produced is filled in the electrolyzing chamber 14c, and overflows from an upper portion of the electrolyzing chamber 14c thereby to be accumulated in the reservoir tank 14d.

Upon the detection of the level of the sterilizing liquid in the reservoir tank 14d by the water level sensor W2, the driving of the metering pump P3 and the opening and closing of the electromagnetic valve B6 are controlled on the basis of a detection output. Thus, the amount of the electrolytic solution to be introduced into the electrolyzing chamber 14c is controlled. The amount of the sterilizing liquid overflowing the electrolyzing chamber 14c is indirectly controlled, so that the level of the sterilizing liquid in the reservoir tank 14d is controlled at the predetermined level.

The water treating device having the batch process electrolyzing chamber 14 operates in the following manner.

Referring mainly to FIG. 6, the water is pumped out of the water container 2 by a circulation pump 22. After organic substances are removed from the water by the filter 21, the water is diverged at the branch J1, so that a part of the water is fed back into the water container 2 through the heat exchanger 23 and a part of the water flows into the feed line 35.

A part of the to-be-treated water circulated in the main circulation line 20 flows into the bypass line 41, and the flow rate thereof is regulated at a substantially constant level by the constant flow rate valve B11. Then, the residual chlorine concentration is measured by the residual chlorine sensor 26. Thereafter, the to-be-treated water passes through the flow switch 27 and is returned into the main circulation line 20.

A part of the water flowing into the feed line 35 is fed into the electrolyzing chamber 14c of the batch process electrolyzing chamber 14 after the flow rate thereof is regulated by the regulation valve B5. A part of the to-be-treated water is fed into the salt water tank 31 through the regulation valve B10 and the electromagnetic valve B11. Since NaCl is preliminarily provided in the salt water tank 31, NaCl is dissolved in the to-be-treated water flowing into the salt water tank 31 to provide the saturated salt water. The saturated salt water in the salt water tank 31 is pumped out into the electrolyzing chamber 14c by the operation of the metering pump P3. At this time, the saturated salt water is mixed with the to-be-treated water flowing through the feed line 35 to provide the electrolytic solution.

The electrolytic solution flowing into the electrolyzing chamber 14c is electrolyzed by the energization of the electrode set E2 to provide a high concentration sterilizing liquid. The sterilizing liquid overflows the electrolyzing chamber 14c, and is stored in the reservoir tank 14d. The amount of the sterilizing liquid in the reservoir tank 14d is detected by the water level sensor W2. When the level of the sterilizing liquid reaches the predetermined level, the supply of the electrolytic solution from the circulation line 35 is stopped on standby.

The sterilizing liquid stored in the reservoir tank 14d is supplied as required on the basis of the result of the measurement of the residual chlorine concentration performed by the residual chlorine sensor 26. That is, the feed pump P2 is driven as required, so that the sterilizing liquid flows through the feed line 35 and then into the main circulation line 20 at the junction J2 and is returned into the water container 2.

Figure 9:
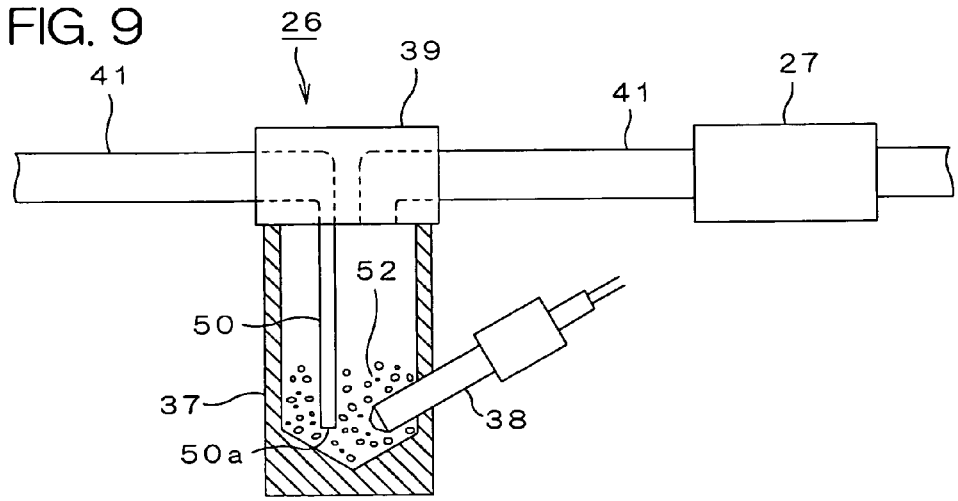
FIG. 9 is a schematic sectional view of a residual chlorine sensor employed in the water treating device according to the second embodiment of the present invention.

Referring to FIG. 9, an explanation will be given to the construction of the residual chlorine sensor 26 employed in the water treating device according to this embodiment. In this embodiment, the residual chlorine sensor 26 is of in-line type employing the polarography method. The measurement employing the polarography method is performed in the same manner as in the first embodiment and, therefore, no explanation will be given thereto.

The residual chlorine sensor 26 includes a housing 37, an electrode 38 disposed in the housing 37, and a cover 39 which covers an open top of the housing 37.

A tail pipe 50 of the bypass line 41 on an inlet side is inserted in the housing 37 through the cover 39, and an outlet port 50a thereof generally faces the bottom of the housing 37. The cover 29 is further connected to the bypass line 41 on an outlet side, and the flow switch 27 is provided in the bypass line 41.

The flow switch 27 senses whether the to-be-treated water flows through the bypass line 41. Where it is judged that the to-be-treated water does not flow through the bypass line 41 with the flow switch 27 being off, for example, the to-be-treated water is not supplied into the residual chlorine sensor 26, so that accurate measurement of the residual chlorine concentration is difficult. In such a case, a control section not shown causes information means to give information to a system administrator, and interrupts the operation of the water treating device. Since the flow switch 27 is provided immediately downstream of the residual chlorine sensor 26, a failure in the supply of the to-be-treated water in the residual chlorine sensor 26 can assuredly be detected which may occur due to water leakage or clogging of the bypass line 41.

A multiplicity of beads 52 are contained in the housing 37 in contact with the electrode 38 provided in the bottom of the housing 37. The to-be-treated water flowing into the bottom of the housing 37 from the outlet port 50a agitates the beads 52. The agitated beads 52 are brought into contact with the electrode 38, whereby the electrode 38 is cleaned for constantly ensuring the accurate measurement of the residual chlorine concentration.

The control section not shown compares the residual chlorine concentration of the to-be-treated water measured by the electrode 38 of the residual chlorine sensor 26 with a reference concentration stored in a memory. Where the residual chlorine concentration of the to-be-treated water is below the reference concentration, a control signal is applied to the driver. Then, the feed pump P2 is driven for a predetermined period to supply the sterilizing liquid into the water container 2. Thus, the residual chlorine concentration of the water container 2 is adjusted, so that the water in the water container 2 is kept clean.

In this embodiment, the circulation pump 22 provided in the main circulation line 20 is utilized for supplying the to-be-treated water to the bypass line 41. However, a pump dedicated for supplying the to-be-treated water into the bypass line 41 may be provided.

In this embodiment, the bypass line 41 is diverged from the main circulation line 20 downstream of the filter 21, and joins the main circulation line 20 downstream of the heat exchanger 23. Alternatively, the bypass line may be diverged from the main circulation line downstream of the filter 21 and join the main circulation line upstream of the circulation pump 22.

Figure 10:
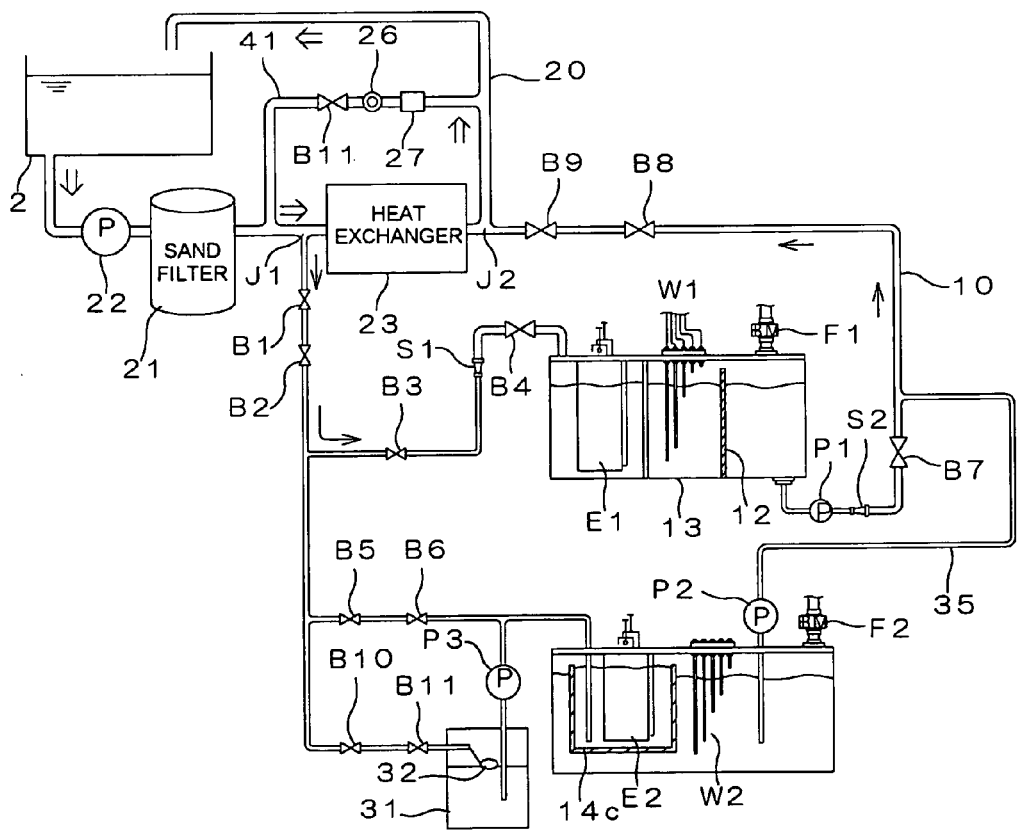
FIG. 10 is a diagram schematically illustrating a water treating device according to a third embodiment of the present invention.

FIG. 10 is a diagram schematically illustrating the construction of a water treating device incorporated in a large-scale water container 2 in accordance with a third embodiment of the present invention.

The construction of the water treating device shown in FIG. 10 is characterized in that a feed line 35 having a batch process electrolyzing chamber 14 as described in the second embodiment is connected parallel to a water treatment line 10 having an air/liquid separation chamber 13 as described in the first embodiment.

The water treating device shown in FIG. 10 is constructed such that a bypass line 41 is diverged from a main circulation line 20 and a residual chlorine sensor 20 is disposed in the bypass line as in the second embodiment. Therefore, the bypass line 11 and the residual chlorine sensor 26 provided in the water treatment line 10 in the first embodiment are not provided.

Alternatively, the construction of the first embodiment in which the bypass line 11 is provided in the water treatment line 10 and the residual chlorine sensor 26 is provided in the line 10 may be employed without the provision of the bypass line 41 and the residual chlorine sensor 26 in the main circulation line 20.

Since the other construction is such that the arrangement of the first embodiment is connected parallel to the arrangement of the second embodiment, like components are denoted by like reference numerals, and no explanation will be given thereto.

Figure 11:
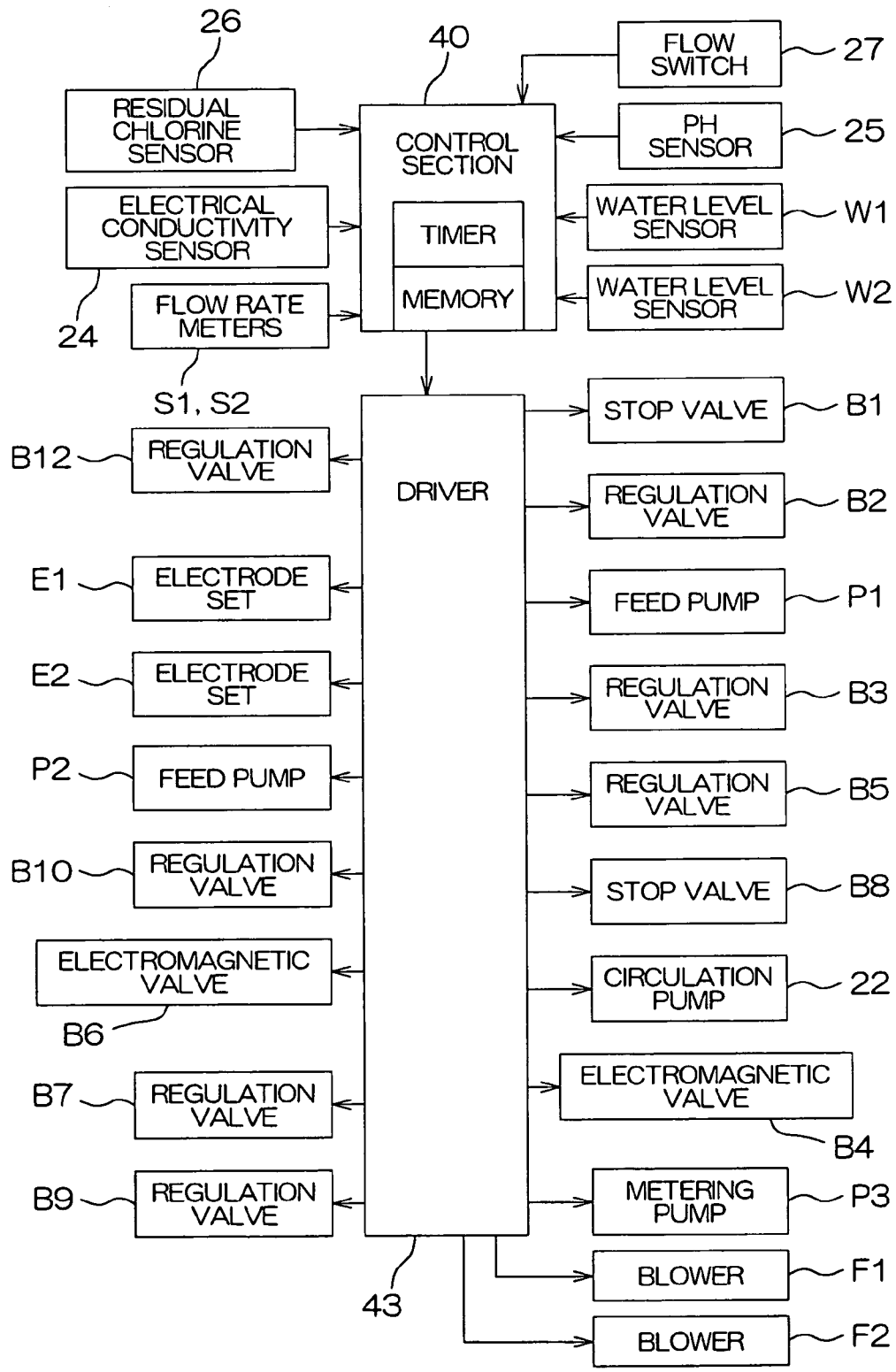
FIG. 11 is a block diagram illustrating the electrical construction of the water treating device according to the third embodiment of the present invention.

FIG. 11 is a block diagram illustrating the electrical construction of the water treating device shown in FIG. 10 in accordance with the third embodiment of the present invention. The water treating device includes a control section 40 and a driver 43. Detection signals of the residual chlorine sensor 26, an electrical conductivity sensor 24, flow rate meters S1, S2, a flow switch 27, a PH sensor 25 and water level sensors W1, W2 are applied to the control section 40. The control section 40 controls the operation of the water treating device on the basis of the detection signals from the respective sensors and the like in accordance with an operation program. More specifically, control signals are applied to the driver 43, which in turn controls the driving of respective valves B1 to B12, electrode sets E1, E2, feed pumps P1, P2, a metering pump P3, a circulation pump 22 and blowers F1, F2.

Figure 12:
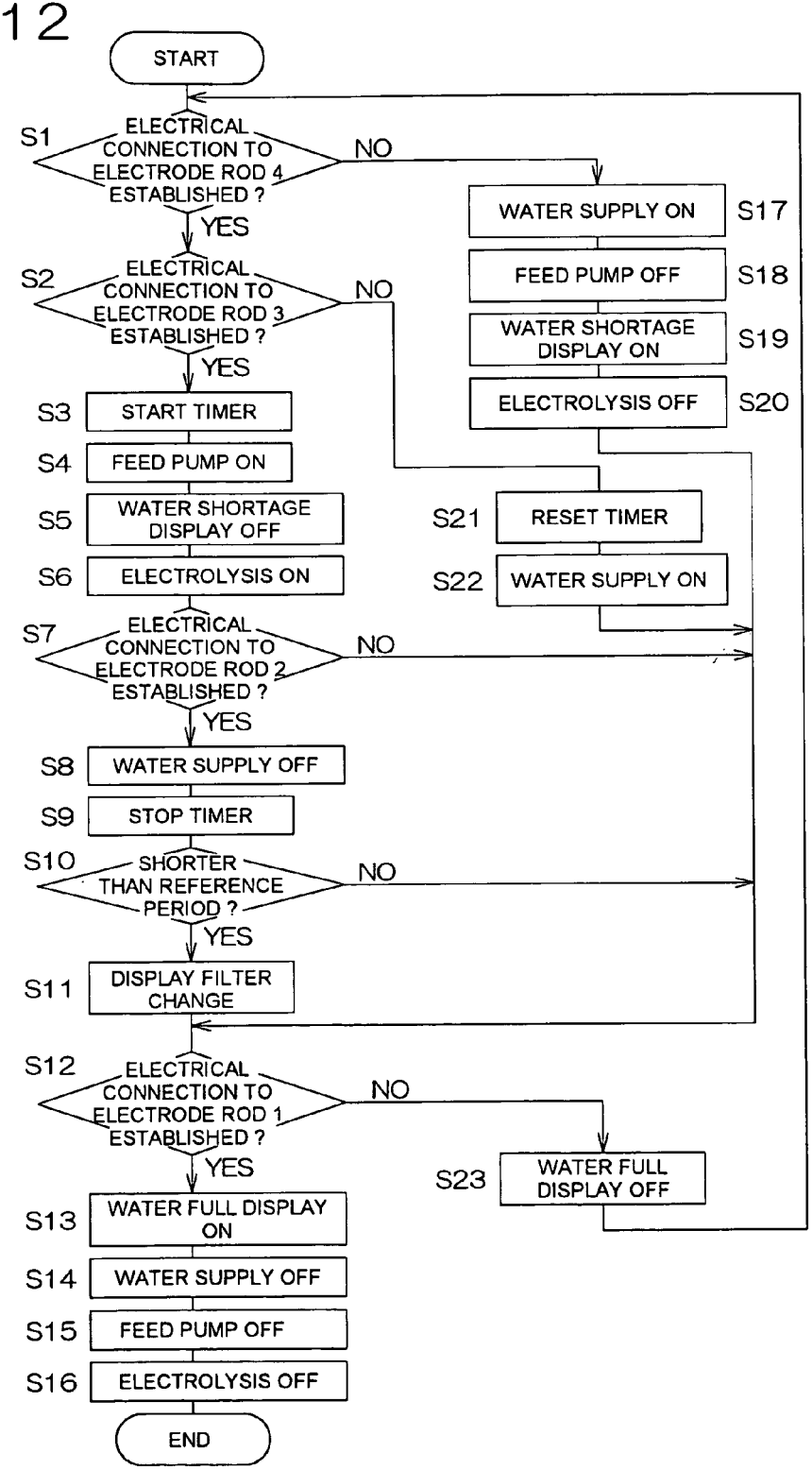
FIG. 12 is a flow chart for explaining the flow of a control process to be performed by a control section shown in FIG. 11, particularly, a water level detecting process to be performed in an air/liquid separation chamber by employing a water level sensor.

FIG. 12 is a flow chart for illustrating the flow of a control process to be performed by the control section 40 shown in FIG. 11, particularly, a water level detecting process to be performed by employing the water level sensor W1 in the air/liquid separation chamber 13.

When the power supply to the water treating device is turned on and the respective components of the water treatment line 10 are actuated to introduce the to-be-treated water into an upstream region 13a of the air/liquid separation chamber 13, the control section 40 checks whether electrical connection to an electrode rod SW4 is established (Step S1).

In Step S1, a check for abnormal water shortage is made. At the initial stage of the operation, the water level does not reach the electrode rod SW4, so that the water supply to the air/liquid separation chamber 13 is continued with the electrode valve B4 being open and with the feed pump P1 being off (Steps S17, S18). Information on water shortage is displayed on a display section not shown, and energization of the electrode set E1 is kept off (Steps S19, S20). Then, the process goes to Step S12.

In Step S12, a check for an abnormal water full state is made. In a normal state, electrical connection to an electrode rod SW1 for detection of an abnormal water full state is not established, so that the process returns to Step S1 without any display. Thereafter, the water is further supplied into the air/liquid separation chamber 13 and, if a water level is reached at which the electrical connection to the electrode rod SW4 is established (YES in Step S1), it is checked whether a water level is reached at which electrical connection to an electrode rod SW3 is established (Step S2).

In Step S2, it is checked whether the water level reaches a lower limit water level. If it does not reach the lower limit water level with the electrical connection to the electrode rod SW3 being not established (NO in Step S3), the timer is reset, and the electromagnetic valve B4 is kept open. Then, the process goes to Step S12 to make the check for the abnormal water full state, and the process returns to Step S1. Thus, the water supply is continued, while the check for the abnormal water full state and the check for the abnormal water shortage are made.

When it reaches the lower limit water level with the electrical connection to the electrode rod SW3 being established in Step S2, the timer is started, and the feed pump P1 is actuated. Then, the display of the water shortage information is stopped, and a DC voltage is applied to the electrode set E1 to start electrolysis of the to-be-treated water (Steps S3, S4, S5, S6). In Step S4, the feed rate at the feed pump P1 is set lower than the flow rate of the water to be supplied into the air/liquid separation chamber 13.

In Step S7, it is checked whether the water level reaches an upper limit water level. If it does not reach the upper limit water level with electrical connection to an electrode rod SW2 being not established (NO in Step S7), the process goes to Step S12 to make the check for the abnormal water full state. While the check for the abnormal water shortage is made in Step S1, Steps S1 to S6, S12 and S23 are repeatedly performed.

After it is confirmed that the water level reaches the lower limit water level with the electrical connection to the electrode rod SW3 being established in Step S2, the water level rises to the upper limit water level and, if the electrical connection to the electrode rod SW2 is established (YES in Step S7), the electromagnetic valve B4 is closed to stop the water supply, and the timer is stopped (Steps S8, S9). Then, the process goes to Step S10.

In Step S10, it is judged whether the count of the timer is smaller than a reference period. If the count of the timer is smaller than the reference period, it is judged that an air/liquid separation filter 12 is clogged, and information is given to a user by display means, a buzzer or the like not shown (Step S11).

On the other hand, if it is judged in Step S11 that no clogging occurs in the filter 12 with the count of the timer being greater than the reference period, the process goes to Step S12 to make the check for the abnormal water full state. Then, the process returns to Step S1. While the check for the abnormal water shortage is made, it is waited for the water level to return to the lower limit water level (Steps S1 to S12 and S23).

Since the water supply is stopped by closing the electromagnetic valve B4 in Step S8, the water level is gradually lowered. When the water level is lowered to the lower limit water level and the electrical connection to the electrode rod SW3 is interrupted (NO in Step S2), the timer is started, and the electromagnetic valve B4 is opened again (steps S21, S22), whereby the water level in the air/liquid separation chamber 13 is constantly control at a level between the upper limit water level and the lower limit water level.

If the water level in the air/liquid separation chamber 13 exceeds the upper limit water level due to some abnormality of the system, the electrical connection to the electrode rod SW1 is established (YES in Step S12). Then, information on the abnormal water full state is given by the display section, the buzzer or the like not shown and, immediately thereafter, the electromagnetic valve B4 and the feed pump P1 are stopped and the energization of the electrode set E1 is stopped (Steps S13, S14, S15, S16). The check for the abnormal water full state is constantly made during the water level detection controlling process.

If the water level is lowered below the lower limit water level due to some abnormality of the system, the electrical connection to the electrode rod SW4 is interrupted (NO in Step S1), and the process goes to Step S17. If the electromagnetic valve B4 is not open, the electromagnetic valve B4 is opened for the water supply, and the feed pump P1 is stopped (Steps S17, S18). Then, information on the abnormal water shortage is given to the user by the display section or the buzzer not shown, and the energization of the electrode set E1 is stopped (Steps S19, S20). Like the check for the abnormal water full state, the check for the abnormal water shortage is constantly made during the water level detection controlling process.

Figure 13:
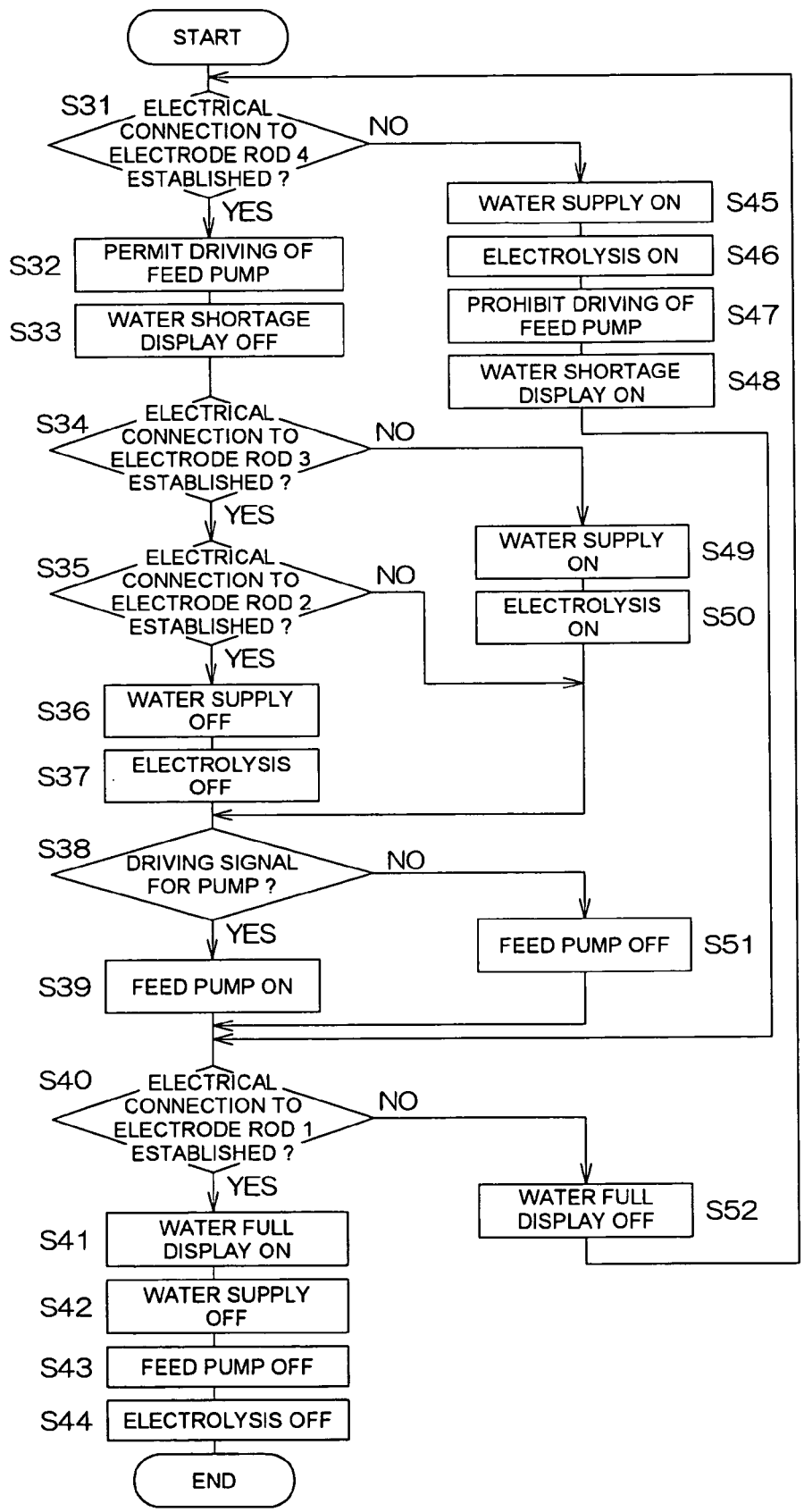
FIG. 13 is a flow chart for explaining the flow of a control process to be performed by the control section shown in FIG. 11, particularly, a water level detecting process to be performed in a batch process electrolyzing chamber by employing a water level sensor.

FIG. 13 is a flow chart for illustrating the flow of a control process to be performed by the control section 40, particularly, a water level detection process to be performed by employing the water level sensor W2 in the batch process electrolyzing chamber 14.

The sterilizing liquid produced in the batch process electrolyzing chamber 14 is supplied in a predetermined amount into the water container 2 through the water treatment line 10 by actuation of the feed pump P2 only when the residual chlorine concentration of the to-be-treated water in the water container 2 is reduced below a predetermined level. Where the residual chlorine concentration satisfies the predetermined level, the feed pump P2 is kept off on standby.

When the power supply to the water treating device is turned on and the respective components of the feed line 35 are actuated to start the supply of the electrolytic solution into an electrolyzing chamber 14c of the batch process electrolyzing chamber 14, the control section 40 first checks whether the electrical connection to an electrode rod SW4 is established (Step S31).

In Step S31, a check for abnormal water shortage is made. In general, the water level does not reach the electrode rod SW4 at the initial stage of the operation. Therefore, the process goes to Step S45 for water supply to the electrolyzing chamber by actuation of the electromagnetic valve B6 for adjusting the amount of the to-be-treated water for dilution and actuation of the metering pump P3 for sucking out the saturated salt water. Then, the electrode set E2 is energized to start the electrolysis (Step S46). With the feed pump P2 kept off, information on the abnormal water shortage is displayed on the display section not shown (Steps S47, S48), and the process goes to Step S40.

In Step S40, a check for abnormal water full state is made. Since electrical connection to an electrode rod SW1 for the detection of the abnormal water full state is not established in a normal state, information on the abnormal water full state is not displayed (Steps S40, S52), and the process goes to Step S31.

With the water supply continued, the electrolysis is performed for a while. Then, the level of the sterilizing liquid in the electrolyzing chamber 14c rises, and the sterilizing liquid overflows the electrolyzing chamber 14c thereby to be accumulated in a reservoir tank 14d. When the sterilizing liquid in the reservoir tank 14d reaches the electrode rod SW4, electrical connection to the electrode rod SW4 is established (YES in Step S31). Upon the establishment of the electrical connection to the electrode rod SW4, the actuation of the feed pump P2 is permitted, and the display of the information on the abnormal water shortage is stopped (Steps S32, S33). Then, the process goes to Step S34.

In Step S34, it is checked whether the water level reaches the lower limit water level with electrical connection to an electrode rod SW3 established. If it does not reach the lower limit water level with the electrical connection to the electrode rod SW3 not established (NO in Step S34), the process goes to Step S49, and the supply of the electrolytic solution and the energization of the electrode set E2 are continued (Steps S49, S50). Then, the process goes to Step S38.

On the other hand, if it is confirmed that the water level reaches the lower limit water level with the electrical connection to the electrode rod SW3 established (YES in Step S34), the process goes to Step S35. Then, it is checked whether the water level reaches the upper limit water level with electrical connection to an electrode rod SW2 established. If it does not reach the upper limit water level with the electrical connection to the electrode rod SW2 not established (NO in Step S35), the process goes to Step S38.

In Step S38, it is judged whether a driving signal for the feed pump P2 is present. If the residual chlorine concentration of the to-be-treated water in the water container 2 satisfies the predetermined level, the driving signal for the feed pump P2 is not outputted, so that the feed pump P2 is kept off (Step S51). On the other hand, if the residual chlorine concentration of the to-be-treated water is lower than the predetermined level, the control section outputs the driving signal for the feed pump P2, and the feed pump P2 is driven for a predetermined period, whereby the sterilizing liquid is supplied into the water container 2 through the feed line 35 (Step S38, S39). Then, the process goes to Step S40.

After the check for the abnormal water full state is made in Step S40, the process returns to Step S31. The supply of the electrolytic solution into the electrolyzing chamber 14c is continued, and the sterilizing liquid overflowing the electrolyzing chamber 14 is accumulated in the reservoir tank 14d, while the check for the abnormal water shortage and the check for the abnormal water full state are repeated until the water level reaches the upper limit water level with electrical connection to an electrode rod SW2 established.

Thereafter, the water level in the reservoir tank 14d rises with the water supply continued and, when it is confirmed that the water level reaches the upper limit water level with the electrical connection to the electrode rod SW2 established (YES in Step S35), the driving of the electromagnetic valve B6 and the metering pump P3 is stopped to stop the supply of the electrolytic solution into the electrolyzing chamber 14c, and the energization of the electrode set E2 is stopped to stop the electrolysis (Steps S36, S37). Then, the process goes to Step S40, and the check for the abnormal water full state and the check for the abnormal water shortage are made in Steps S40 and S31, respectively, on standby.

Thereafter, the driving signal for the feed pump P2 is outputted to supply the sterilizing liquid into the water container 2 from the reservoir tank 14d as required. Whenever the feed pump P2 is actuated, the level of the sterilizing liquid in the reservoir tank 14d is lowered, and the electrical connection to the electrode rod SW2 is interrupted (No in Step S35). When the electrical connection to the electrode rod SW3 is interrupted, the electromagnetic valve B6 and the metering pump P3 are actuated again, and the electrode set E2 is energized to restart the electrolysis (Steps S34, S49, S50). Thereafter, the aforesaid control operation is repeatedly performed.

Where the water level in the reservoir tank 14d exceeds the upper limit water level due to some abnormality of the system, this is detected on the basis of whether or not the electrical connection to the electrode rod SW1 is established in Step S40. When the abnormal water full state is detected, a process from Step S41 to Step S44 is performed. A control operation for this process is substantially the same as the aforesaid control operation, and no explanation will be given thereto.

In this embodiment, the batch process electrolyzing chamber 14 doubles as the reservoir tank 14d, but may be provided separately from the reservoir tank 14d. In this case, the aforesaid effects can be ensured by providing water level sensors respectively in the electrolyzing chamber 14c and the reservoir tank 14d.

It should be understood that the present invention be not limited to the embodiments described above, but various modifications may be made within the scope of the present invention defined by the following claims.

This application claims priority benefits under the Convention on the basis of Japanese Patent Applications No. 2001-131770 and No. 2001-151537 filed with the Japanese Patent Office on Apr. 27, 2001, the disclosure thereof being incorporated herein by reference.

What is claimed is:

1. A water treating device comprising:
    a water container for containing water to be treated;
    an electrolyzing chamber for sterilizing the to-be-treated water by way of electrochemical decomposition by energization of an electrode set consisting of at least two electrode plates;
    a water treatment line through which the to-be-treated water is introduced into the electrolyzing chamber from the water container and fed back into the water container after the sterilization of the water in the electrolyzing chamber;
    a residual chlorine sensor for measuring a residual chlorine concentration of the to-be-treated water before the water is introduced into the electrolyzing chamber; and
    control means for controlling an amount of the to-be-treated water to be subjected to the electrochemical decomposition in the electrolyzing chamber on the basis of the residual chlorine concentration measured by the residual chlorine sensor to keep a residual chlorine concentration of the water to be fed back into the water container within a predetermined range;
    wherein a bypass line is provided which is branched from the water treatment line at a position upstream of the electrolyzing chamber for sampling the to-be-treated water, introducing the sampled to-be-treated water into the residual chlorine sensor for the measurement of the residual chlorine concentration of the sampled to-be-treated water, and discharging the sampled to-be-treated water into the electrolyzing chamber after the measurement.

2. A water treating device as set forth in claim 1, wherein the residual chlorine sensor is located at a position upper than the electrolyzing chamber in the bypass line.

3. A water treating device comprising:
a water container for containing water to be treated;
an electrolyzing chamber for causing electrochemical decomposition by energization of an electrode set consisting of at least two electrode plates;
a feed line for filling the electrolyzing chamber with an electrolytic solution containing chlorine ions and having a function of promoting the electrochemical decomposition and, in this state, producing a sterilizing liquid having a sterilizing capability by way of electrolysis of the electrolytic solution by the energization of the electrode set, and supplying the produced sterilizing liquid into the water container;
a residual chlorine sensor for measuring a residual chlorine concentration of the to-be-treated water; and
introduction amount controlling means for controlling an amount of the sterilizing liquid to be introduced into the water container on the basis of the residual chlorine concentration of the to-be-treated water measured by the residual chlorine sensor;
wherein a bypass line is provided which is connected to the water container for introducing the to-be-treated water into the residual chlorine sensor from the water container for the measurement of the residual chlorine concentration of the to-be-treated water, and feeding the introduced to-be-treated water back into the water container after the measurement.

4. A water treating device as set forth in claim 1, wherein a filter device for filtering the to-be-treated water taken out of the water container and a constant flow rate valve for controlling a flow rate of the to-be-treated water filtered by the filter device at a substantially constant level are provided upstream of the residual chlorine sensor.

5. A water treating device as set forth in claim 4, wherein the residual chlorine sensor is a residual chlorine sensor of in-line type.

6. A water treating device comprising:
a water container for containing water to be treated;
an electrolyzing chamber for causing electrochemical decomposition by energization of an electrode set consisting of at least two electrode plates;
a feed line for filling the electrolyzing chamber with an electrolytic solution containing chlorine ions and having a function of promoting an electrochemical reaction and, in this state, producing a sterilizing liquid having a sterilizing capability by way of the electrochemical decomposition of the electrolytic solution by the energization of the electrode set, and supplying the produced sterilizing liquid into the water container;
water level detecting means for detecting a water level in the electrolyzing chamber; and
water level controlling means for controlling an amount of the sterilizing liquid to be introduced into the electrolyzing chamber on the basis of water level data from the water level detecting means to keep the water level in the electrolyzing chamber at a predetermined level;
wherein the water level detecting means has at least two electrodes disposed in spaced opposed relation and is adapted to detect the water level on the basis of whether an electric current flows between the electrodes.

7. A water treating device as set forth in claim 6, wherein the electrolyzing chamber comprises a tank for storing therein the produced sterilizing liquid and feeding the stored sterilizing liquid back into the water container as required,
wherein the water level controlling means controls an amount of the sterilizing liquid to be produced in the electrolyzing chamber on the basis of the data from the water level detecting means to keep a level of the sterilizing liquid stored in the tank at a predetermined level.

8. A water treating device, comprising:
a water container for containing water to be treated;
an electrolyzing chamber for causing electrochemical decomposition by energization of an electrode set comprising at least two electrode plates;
a water treatment line through which the to-be-treated water is introduced into the electrolyzing chamber from the water container and fed back into the water container after sterilization of the water by the electrochemical decomposition in the electrolyzing chamber;
water level detecting means for detecting a water level in the electrolyzing chamber; and
water level controlling means for controlling an amount of the to-be-treated water to be introduced into the electrolyzing chamber on the basis of water level data from the water level detecting means to keep the water level in the electrolyzing chamber at a predetermined level;
wherein the water level detecting means has at least two electrodes disposed in spaced opposed relation and is adapted to detect the water level on the basis of whether an electric current flows between the electrodes; and
wherein the electrodes of the water level detecting means are composed of a metal of titanium or a titanium alloy.

9. A water treating device as set forth in claim 3, wherein a filter device for filtering the to-be-treated water taken out of the water container and a constant flow rate valve for controlling a flow rate of the to-be-treated water filtered by the filter device at a substantially constant level are provided upstream of the residual chlorine sensor.

10. A water treating device as set forth in claim 9, wherein the residual chlorine sensor is a residual chlorine sensor of in-line type.

11. A water treating device as set forth in claim 6, wherein the water level detecting means is disposed in a space other than an inter-electrode space in the electrolyzing chamber.

12. A water treating device as set forth in claim 11, wherein a resin separator for separating the electrode plates of the electrolyzing chamber from the electrodes of the water level detecting means is disposed between the electrode plates and the electrodes.

13. A water treating device as set forth in claim 7, wherein the electrodes of the water level detecting means are composed of a metal of titanium or a titanium alloy.

* * * * *